(12) United States Patent
Lucas

(10) Patent No.: US 8,727,752 B2
(45) Date of Patent: May 20, 2014

(54) THREE ELEMENT DIAPHRAGM DAMPER FOR FUEL PUMP

(75) Inventor: Robert G. Lucas, Ellington, CT (US)

(73) Assignee: Stanadyne Corporation, Windsor, CT (US)

( * ) Notice: Subject to any disclaimer, the term of this patent is extended or adjusted under 35 U.S.C. 154(b) by 558 days.

(21) Appl. No.: 12/924,849

(22) Filed: Oct. 6, 2010

(65) Prior Publication Data

US 2012/0087817 A1   Apr. 12, 2012

(51) Int. Cl.
*F04B 11/00* (2006.01)
*F04B 53/00* (2006.01)

(52) U.S. Cl.
CPC ............. *F04B 11/00* (2013.01); *F04B 11/0008* (2013.01); *F04B 53/001* (2013.01); *F04B 53/004* (2013.01)
USPC ............ 417/541; 417/395; 417/540; 417/542

(58) Field of Classification Search
CPC .... F04B 11/0008; F04B 53/001; F04B 11/00; F04B 53/004
USPC ................. 417/540, 541, 542, 543, 544, 395; 60/469; 92/89
See application file for complete search history.

(56) References Cited

U.S. PATENT DOCUMENTS

| | | | | |
|---|---|---|---|---|
| 4,513,194 A | * | 4/1985 | Mastromatteo | 219/121.13 |
| 4,938,463 A | * | 7/1990 | Miyamoto | 267/140.13 |
| 7,073,385 B2 | * | 7/2006 | Troyer | 73/700 |
| 7,124,738 B2 | * | 10/2006 | Usui et al. | 123/446 |
| 8,132,558 B2 | * | 3/2012 | Lucas et al. | 123/510 |
| 2007/0079810 A1 | * | 4/2007 | Usui et al. | 123/467 |
| 2008/0056914 A1 | * | 3/2008 | Usui et al. | 417/307 |
| 2008/0175735 A1 | * | 7/2008 | Lucas et al. | 417/540 |
| 2009/0127356 A1 | * | 5/2009 | Junger et al. | 239/585.1 |
| 2009/0185922 A1 | * | 7/2009 | Inoue et al. | 417/540 |
| 2010/0215529 A1 | * | 8/2010 | Inoue | 417/540 |
| 2010/0242922 A1 | * | 9/2010 | Mancini et al. | 123/506 |
| 2011/0103985 A1 | * | 5/2011 | Mancini et al. | 417/540 |
| 2011/0126804 A1 | * | 6/2011 | Lucas et al. | 123/456 |
| 2012/0006303 A1 | * | 1/2012 | Usui et al. | 123/495 |

FOREIGN PATENT DOCUMENTS

| | | | | |
|---|---|---|---|---|
| JP | 2007309118 | * | 11/2007 | F02M 59/44 |
| JP | 2012197732 | * | 10/2012 | F02M 59/44 |

OTHER PUBLICATIONS

JP2007309118_MachineTranslation.*

* cited by examiner

*Primary Examiner* — Peter J Bertheaud
*Assistant Examiner* — Dominick L Plakkoottam
(74) *Attorney, Agent, or Firm* — Alix, Yale & Ristas, LLP

(57) ABSTRACT

A damper assembly for a fuel pump includes at least one diaphragm assembly formed by joining two metal diaphragms to respective two sides of an imperforate central plate, thereby creating a pair of closely spaced diaphragms, each acting upon its own gas volume. Preferably, the diaphragm assembly has (a) a rigid, relatively thick circular or polygonal central plate, (b) a first circular diaphragm having a rim portion sealingly secured as by welding to the plate and a relatively thin, flexible, convex portion projecting from one side of the plate and defining a first pressurized gas volume, and (c) a second circular diaphragm having a rim portion sealingly secured as by welding to the plate and a relatively thin, flexible, convex portion projecting from the other side of the plate and defining an independent second pressurized gas volume.

21 Claims, 9 Drawing Sheets

THREE ELEMENT DIAPHRAGM DAMPER FOR FUEL PUMP

BACKGROUND

The present invention relates to high pressure fuel supply pumps and in particular to damping pressure pulses arising from the reciprocation of a pumping piston that pressurizes fuel for discharge from such pump.

An increasing number of fuel systems for on-road vehicles are adopting the so called "common-rail" configuration, whereby a fuel pump maintains a reservoir or "rail" at a pressure at or above that required for fuel injection, and a plurality of injectors are in fluid communication with the rail via respective injection valves that are electronically actuated, thereby controlling the timing and quantity of fuel delivered from the rail to each cylinder of the engine. The pumps typically contain at least one pumping piston that is reciprocated by a cammed connection to the engine drive shaft. Common rail systems no longer require direct synchronization of a plurality of pumping pistons or rotating hydraulic head, with the injection events. Instead, the pump need only maintain the rail at the desired pressure. As a consequence, designers now favor single piston pumps for a wide variety of operating regimes.

The high pressure pump is typically fed from a low pressure feed line entering the charging line of the pump. Due to the high rate of piston reciprocation of a single piston to produce a sufficient number of discrete quantities of high pressure fuel discharged into the rail, the charging system of the pump can experience significant back pressure pulses which produce unwanted noise and wear on the pump internals. Although techniques are known for back pressure relief to a low pressure sink or auxiliary accumulator, vehicle manufacturers seeking to conserve space in the engine compartment and save cost, are increasingly requiring even single piston fuel pumps to have internal damping, i.e., without flow to a low pressure fuel reservoir or fuel accumulator.

U.S. Publication 2008/0175735 "Inlet Pressure Attenuator for Single Plunger Fuel Pump" and U.S. Pat. Nos. 7,401,594 and 7,124,738 (both titled "Damper Mechanism and High Pressure Fuel Pump") describe techniques for internal damping of pressure pulsations in the low pressure side of a high pressure fuel pump. Two metal diaphragms are joined together around the circumference to envelope an internal volume of pressurized gas ("double diaphragm"). One or two such double diaphragm assemblies are situated in a damping chamber upstream of the inlet valve for the high pressure pumping piston.

The damper system of U.S. Pat. No. 7,124,738 has some inherent drawbacks. Firstly, two convoluted diaphragms are welded to each other on the outer periphery. This creates a condition where the weld strength is compromised. Because the diaphragms are made from a thin material, the resulting weld bead is of a small cross-section and the assembly (with thin capsule shaped diaphragms) has minimal hoop strength and resistance to flexing at the weld. This was overcome according to the '738 patent by clamping the diaphragms with significant force inboard of the weld bead. Secondly, the damper will be overstressed and fail in the convolutions if excess pressure pulsations are encountered due to activation of the high pressure system overpressure relief valve. When this relief valve is functioning, pressure pulsations of two to three times normal operation are encountered. Finally, when one of the flexible diaphragms does fail, the common volume of gas shared by the two diaphragms becomes filled with fluid, causing both diaphragms to become inoperable.

SUMMARY

It is an object of the present invention to provide a plurality of single metal diaphragms that are configured into a small diaphragm assembly for a fuel inlet damper assembly or mechanism, but without the inherent problems associated with the use of a "double diaphragm".

This is accomplished by joining two metal diaphragms to respective two sides of an imperforate central plate, thereby creating two closely spaced diaphragm dampers, each acting upon its own gas volume.

In one aspect, the disclosure is directed to an inlet fuel pressure damper mechanism for a high pressure fuel pump, comprising a central metal plate and two flexible metal diaphragms each separately joined to respective opposite faces of the central plate, thereby trapping two separate gas volumes between the central plate and each of the metal diaphragms, whereby each diaphragm reacts to pressure pulsations by deflecting independently against its respective gas volume.

Preferably, the diaphragm assembly has (a) a rigid, relatively thick circular or polygonal central plate, (b) a first circular diaphragm having a rim portion sealingly secured as by welding to the plate and a relatively thin, flexible, convex portion projecting from one side of the plate and defining a first pressurized gas volume, and (c) a second circular diaphragm having a rim portion sealingly secured as by welding to the plate and a relatively thin, flexible, convex portion projecting from the other side of the plate and defining an independent second pressurized gas volume.

The central plate does not flex during normal operation and acts as a stiffening member, thereby reducing the hoop stress and flexing of the weld. Additionally, the central plate can be configured with diaphragm stroke limiting features that reduce diaphragm flexing and stress when subjected to excess pressure pulsations as can arise when the high pressure system overpressure relief valve operates.

In another aspect, the disclosure is directed to a pressure damper assembly for a fuel inlet passage in a single piston high pressure fuel pump, comprising an inlet fitting, a cover attached to the fitting and having a substantially cylindrical sidewall defining an internal chamber in fluid communication with the fuel inlet passage of the pump, and an open bottom with a bottom edge sealingly attached to the pump. At least one diaphragm assembly is supported within the damping chamber. Each diaphragm assembly includes first and second metal diaphragms having diaphragm rims sealingly secured to respective first and second sides of a central plate and convex central regions spaced from the central plate, thereby defining first and second independent closed gas volumes radially inward of a surrounding diaphragm assembly rim. In this way, feed fuel delivered to the pump through the inlet fitting flows through the damping chamber at a pressure that acts on the first and second diaphragms of each diaphragm assembly before entry into the inlet passage of the pump.

A base plate can optionally be provided to close the bottom of the cover such that the damper unit is entirely independent of the pump except for attachment of the unit to the pump.

BRIEF DESCRIPTION OF THE DRAWING

Embodiments of the invention will be described with reference to the accompanying drawing, in which.

DETAILED DESCRIPTION

Figure 1:
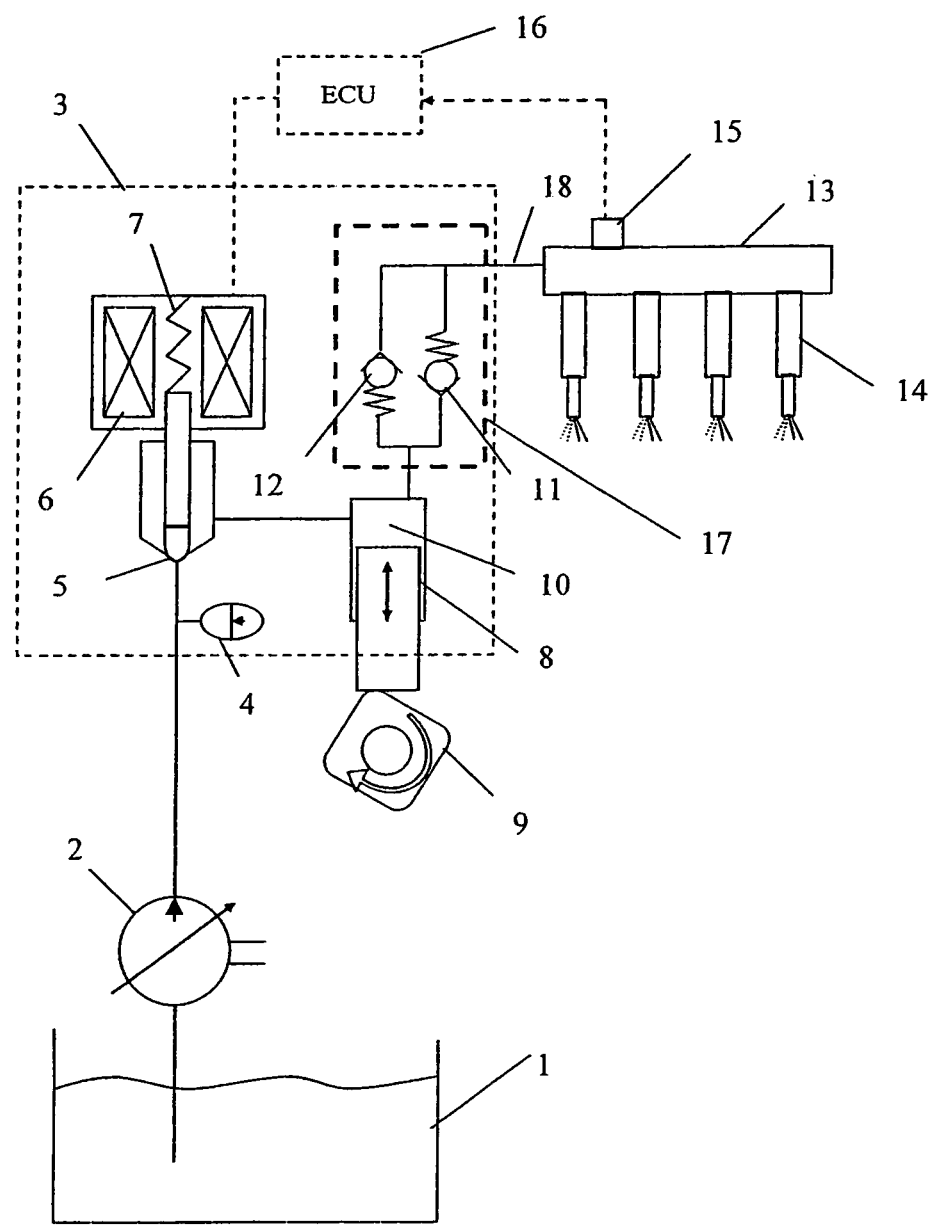
FIG. 1 is an overall schematic illustrating a fuel system for an internal combustion engine.

FIG. 1 is an overall system schematic illustrating the fuel system for an internal combustion engine. The low-pressure pump 2 pressurizes fuel from the fuel tank 1, and delivers it to the high pressure pump housing 3 through an inlet fitting. The fuel then passes through a pressure damper including diaphragm assembly 4, and through a normally closed control valve 5. Alternatively, the pressure damper could be upstream of the pump housing 3. A normally open control valve is also applicable to such a fuel system. The fuel is then drawn into the pumping chamber 10, where it is pressurized by the upward motion of the pumping piston 8 via the engine camshaft 9. The control valve 5 is acted upon by the control valve spring 7 and solenoid 6 to control the quantity of fuel delivered by the high pressure pump. This is accomplished by the accurate timing of the control valve closing relative to the pumping piston upward travel position. When the fuel is pressurized, it then travels through the outlet check valve 11, high pressure line 18, and into the common rail 13 that feeds the engine fuel injectors 14. Because the injectors 14 are fed from a common rail 13, injector timing is flexible. Desired rail pressure is controlled by closed loop ECU 16 feedback and control of the high pressure fuel output via the solenoid 6 and control valve 5 compared to the rail pressure sensor 15 output signal to the ECU 16. A pressure relief valve 12 is required to protect the high pressure system in case of a system malfunction. It is housed in a common fitting assembly 17, which also houses the outlet check valve 11. The pressure relief valve can also be used to control the maximum system pressure to a predefined limit to protect other fuel system components.

Figure 2:
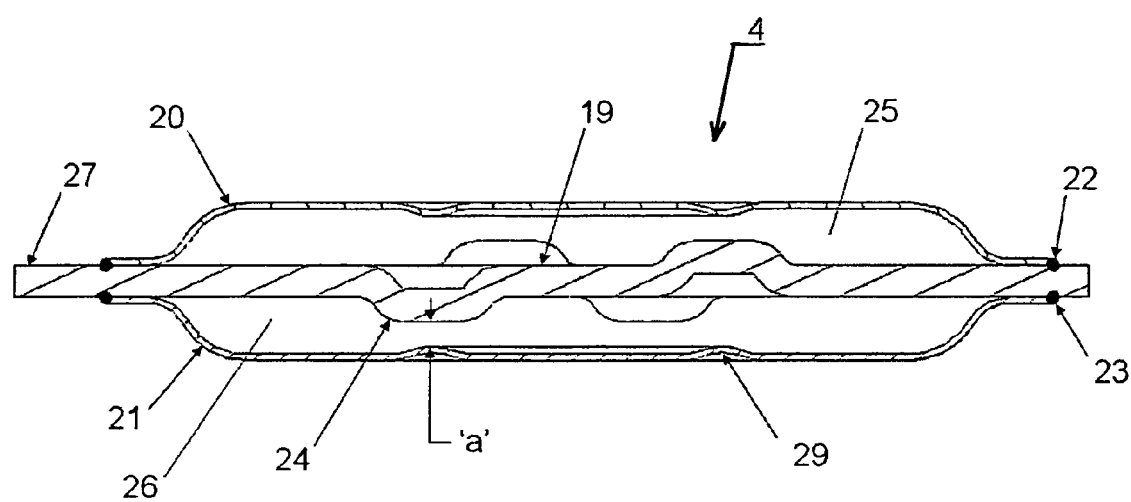
FIG. 2 shows a first embodiment of the pressure damping diaphragm assembly of the present invention, which implements the function of the pressure damper of FIG. 1.

FIG. 2 shows the first embodiment of the present invention, which is directed to the diaphragm assembly 4 of the pressure damper of FIG. 1. Each single metal diaphragm 20 and 21 is welded at its outer periphery by welds 22 and 23 to the surface of center plate 19, thereby trapping two separate gas volumes 25 and 26. The gas volumes can be at the same pressure, or each at its own pressure level (including vacuum), as set during each of the welding operations. The three-part diaphragm assembly (diaphragm 20, diaphragm 21 and center plate 19) is situated in a damping chamber. The diaphragm assembly 4 defines two distinct and independent diaphragms 20, 21 configured as a very space-efficient unit. Because the center plate is not acted upon by fluid pressure, and because it is shaped to be much stiffer in flexure and hoop than the diaphragms, the weld beads 22 and 23 see a low cyclic stress. Therefore the mounting or support of the diaphragm assembly within the damping chamber need not be designed to minimize stresses on the welds 22, 23.

Center plate 19 can be a flat plate, or can incorporate a series of raised features 24 which limit the diaphragm deflection to a defined distance 'a'. The raised features can be designed to contact the diaphragm in one or more locations, i.e., the raised features can be circular or discrete dimples or the like. Cooperating feature 29 is an annular, internally directed groove on the diaphragms, aligned with and intended for contacting the raised features 24 on the center plate. Features 29 can likewise be discrete dimples or the like. The stroke limiting feature 24 can also be designed to work without the annular groove 29. When distance 'a' is reduced to zero during operation (as can be the case when the high pressure relief valve is in operation), the annular groove 29 of diaphragms 20 and/or 21 becomes supported by the center plate, minimizing any added stress in the diaphragms and allowing the two diaphragms to survive. After the excessive pulsations, each diaphragm will return to normal function, operating without contacting the center plate. Another advantage of the present invention is the added benefit of a lower level of function if one diaphragm should fail. If diaphragm 20 should fail, and volume 25 fills with fluid, diaphragm 20 will become inoperable. However, the diaphragm assembly 4 will still function to a lesser degree because damper 21 and volume 26 will remain functional. The periphery or rim 27 of the center plate 19 extends radially outside the welds 22, 23 and can be used to locate and secure the diaphragm assembly 4 without contact against any of the diaphragms 20, 21 or welds 22, 23.

Figure 3:
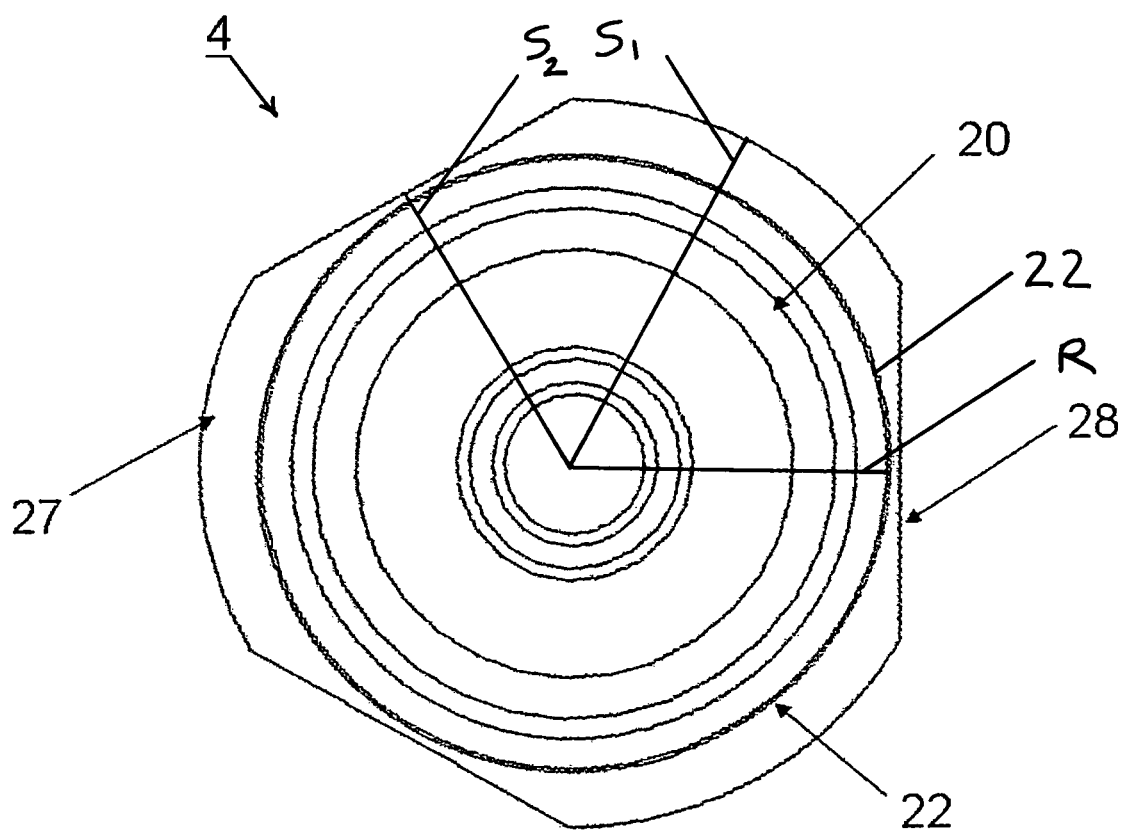
FIG. 3 shows a top view of the diaphragm assembly of FIG. 2.

FIG. 3 shows the top view of the diaphragm assembly of FIG. 2. Although the diaphragm assembly can be circular, the preferred embodiment as shown has a plurality of lobes 27 at a relatively larger radius from the center alternating with a plurality of flats 28 at a relatively smaller radius from the center. The diaphragm assembly is preferably supported within the damping chamber by a fixture or retainer, at the lobes 27. The flats 28 allow fuel flow between the outer side of the upper diaphragm 20 and the outer side of the lower diaphragm 21 when the diaphragm assembly 4 is situated in an infeed fuel path in the damping chamber. The flow feature 28 could be almost any shape that allows adequate flow area.

Figure 4:
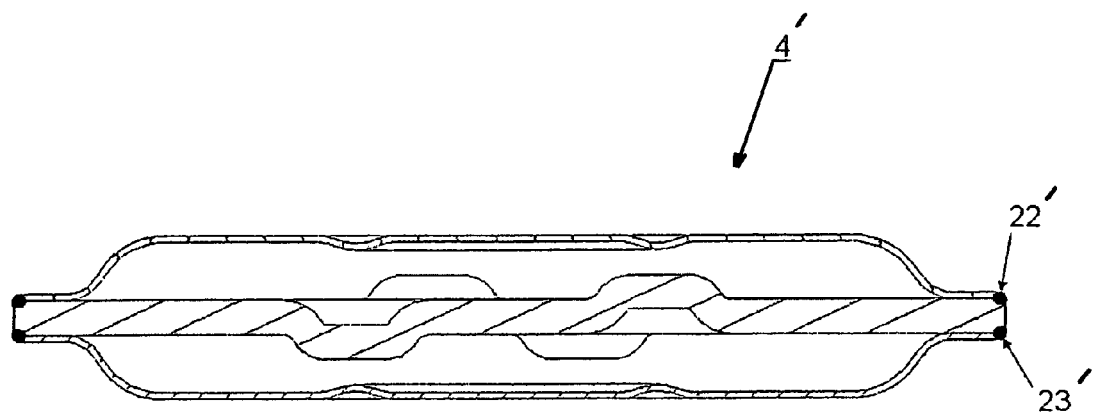
FIG. 4 shows a second embodiment of the present invention.

FIG. 4 shows a second embodiment 4' of the present invention. In this embodiment, the periphery of the circular diaphragms is at the same radius as the periphery of the circular central plate, so mounting rim 27 is eliminated. The mounting support of the diaphragm assembly can be over or adjacent to the welds 22', 23', and the flow features similar to 28 of FIG. 3 can be incorporated into a mating component.

Figure 5:
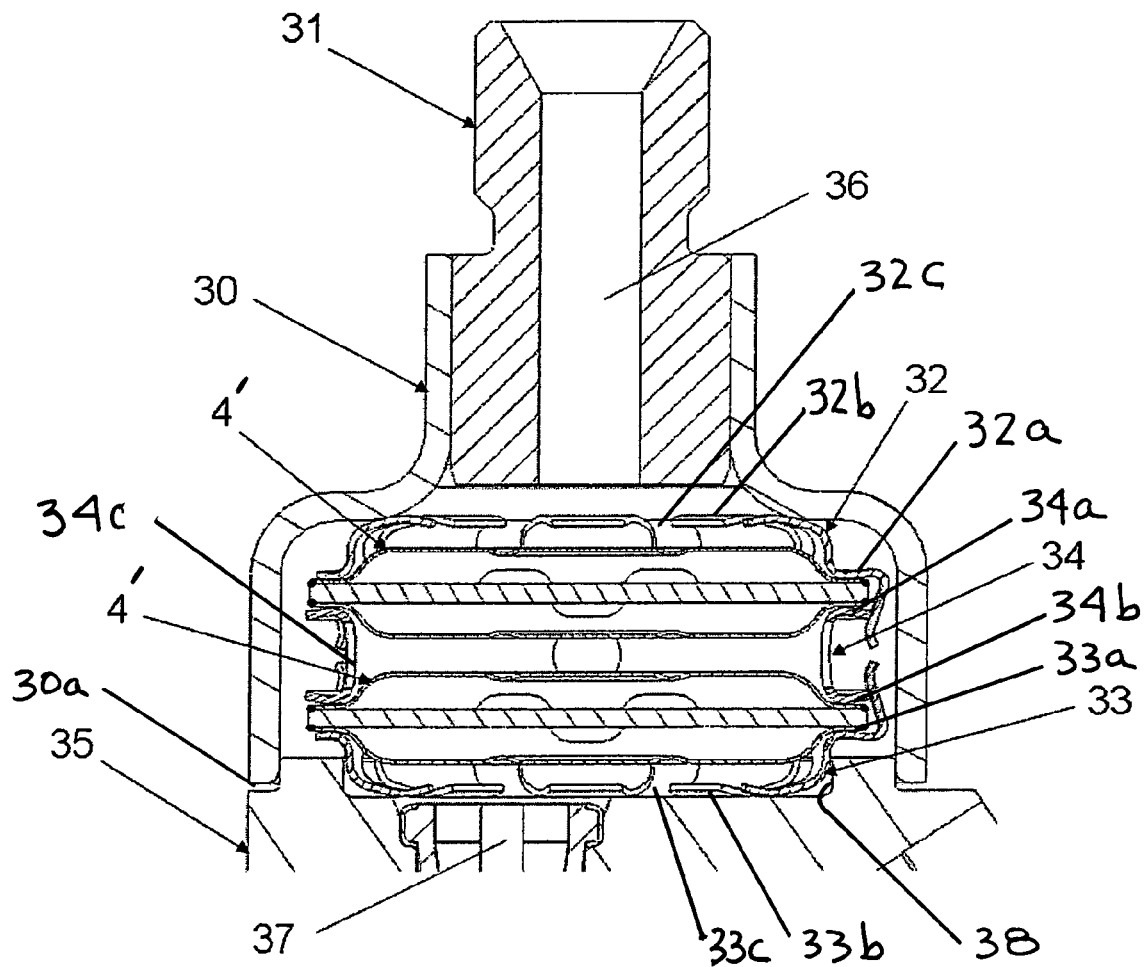
FIG. 5 shows one possible installation of the damper of FIG. 4 within the pump described with respect to FIG. 1.

FIG. 5 shows one possible installation of the damper 4' of FIG. 4. within the pump 3 described in FIG. 1. Item 31 is an inlet fitting of the high pressure pump. Item 30 is a cover defining the damping chamber, which is closed by the pump housing 35. Retainers 32, 33 and spacer 34 locate and provide feed fuel flow to the pair of diaphragm assemblies 4'. The retainer assembly 32, 33, and 34 is compressed between an oblique or horizontal portion of the cover 30 and a substantially horizontal surface of the pump housing 35. Retainer 32 has a rim portion 32a that bears on and biases the top of the rim of the upper diaphragm assembly, retainer 33 has a rim portion 33a that bears on and biases the bottom of the rim of the lower diaphragm assembly, spacer 34 has a radially outwardly directed rim portion 34a that bears on and biases the bottom of the rim of the upper diaphragm assembly, and spacer 34 has a radially outwardly directed rim portion 34b that bears on and biases the top of the rim of the lower diaphragm assembly. The second retainer 33 fits within and is laterally fixed in position by a recess 38 in the pump that is in fluid communication with the fuel inlet passage 37.

The upper retainer 32 has a convex upper portion 32b including a plurality of cut outs or spaces 32c and the lower retainer 33 also has a convex lower portion 33b including a plurality of cut out or spaces 33c. The spacer is substantially ring shape, with spaced apart holes 34c. The cutouts, spaces, and/or holes in the retainers and spacers provide flow paths from all directions onto all four of the diaphragms.

When the bottom edge 30a of the cover is welded to the top of the pump 35, the compressed, biased condition of the rims of the diaphragm assemblies 4' maintains the diaphragm assemblies in place within the damping chamber. Inlet flow path 36 provides communication with the low pressure pump 2 and outlet flow path 37 provides communication with the pump control valve.

Figure 6:
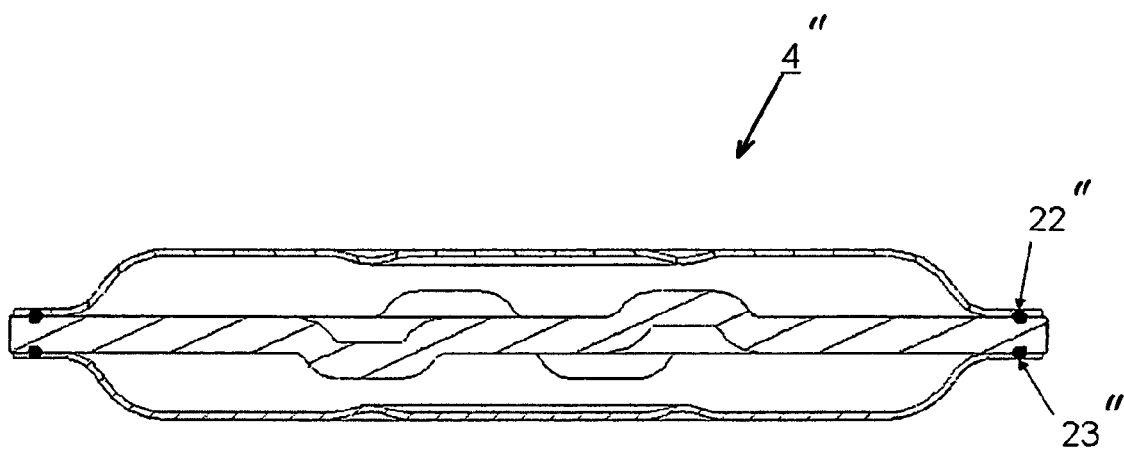
FIG. 6 shows a third embodiment of the present invention.

FIG. 6 shows a third embodiment 4" of the present invention, as a variation of the diaphragm assembly of FIG. 4. The welds 22" and 23" are not located at the outer periphery of the diaphragms and center plate, but are instead through-welds on the diaphragm rims, which penetrate into the rim of the center plate.

Figure 7:
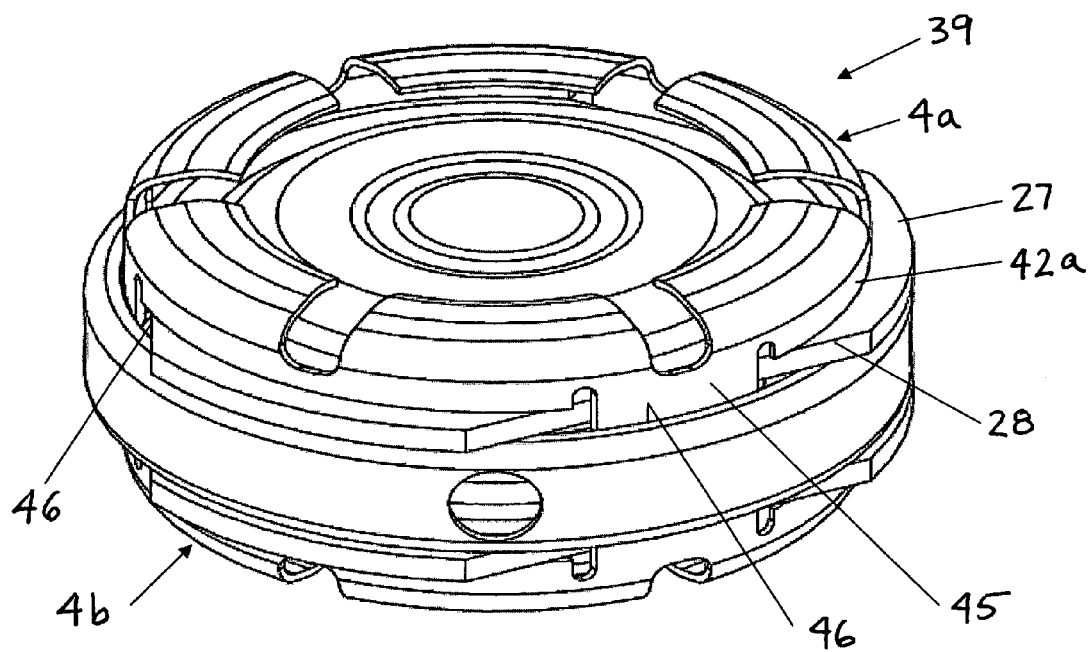
FIG. 7 shows a pair of diaphragm assemblies according to FIG. 3, configured as a damper assembly.
Figure 8:
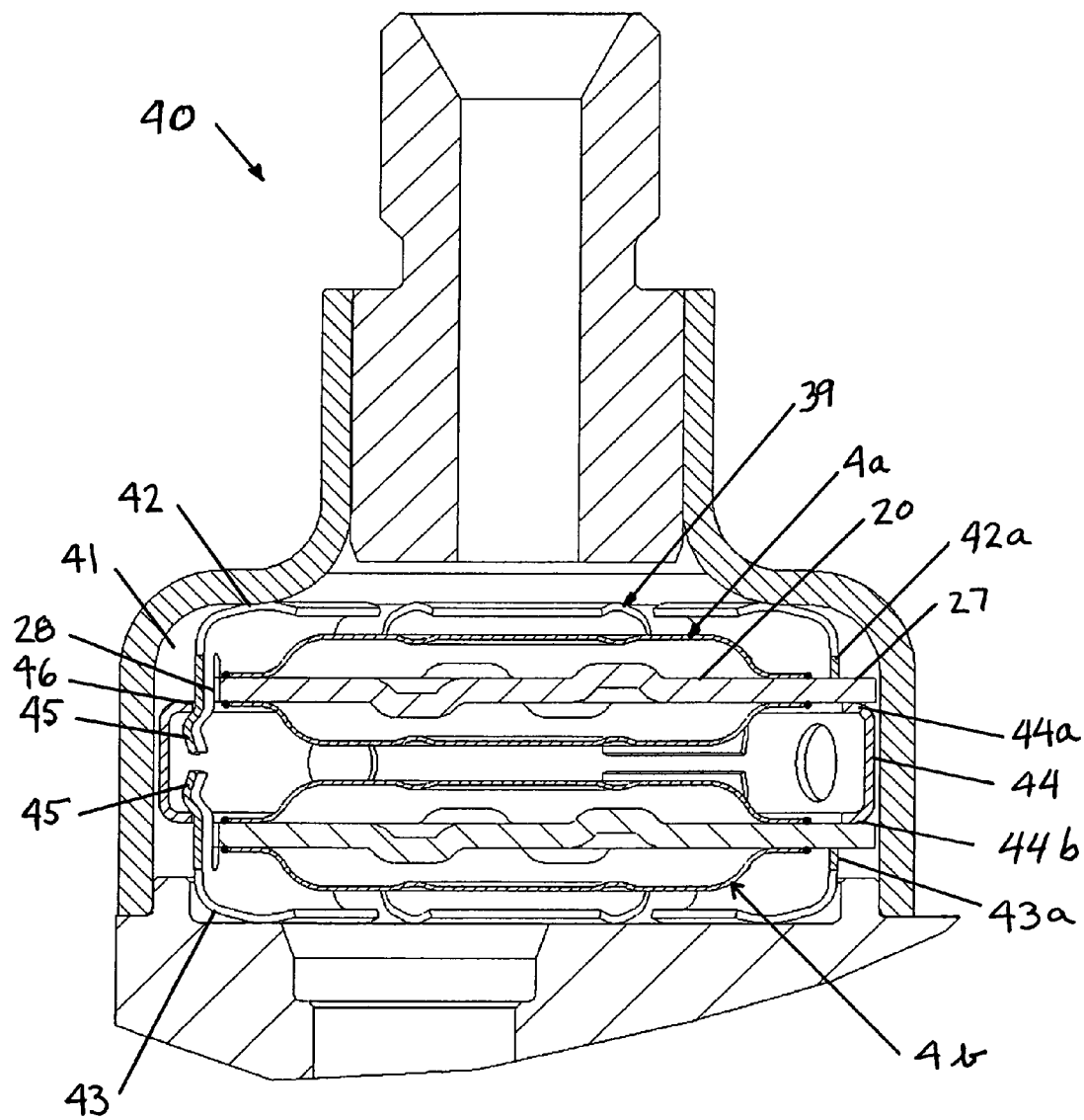
FIG. 8 shows the damper assembly of FIG. 7 installed on a pump as an alternative embodiment to the configuration of FIG. 5.

FIG. 7 shows a pair of diaphragm assemblies 4 according to FIG. 3, configured as a damper assembly 39, and FIG. 8 shows such damper assembly installed in a damping unit 40 on a pump as an alternative to the configuration of FIG. 5.

The center plate 27 of each diaphragm assembly 4 has substantially flat upper and lower surfaces and a peripheral edge, with the upper and lower surfaces extending two dimensionally with a maximum radial span $S_1$ defined by the lobes 27 and a minimum radial span $S_2$ defined by flats 28. The plate minimum span is at least equal to the radius R of the diaphragm rims, preferably greater, so the diaphragm rims are bonded to the plate inside the minimum span. Each diaphragm assembly 4a, 4b is supported in the damping chamber 41 transversely to its plate 20, at portions of the upper and lower plate surfaces that are outside the rims of the diaphragms, and each diaphragm assembly is laterally supported in the damping chamber, at portions of the peripheral edge of the plate. Preferably, each diaphragm assembly is supported in the damping chamber transversely to the plate, at upper and lower surfaces of the lobes 27. The diaphragm assembly can be laterally supported in the damping chamber, at the peripheral edges of the lobes, or as shown, at the peripheral edges of the flats 28. The upper and lower support can be at or include the weldments 22, 23 to the lobes. Whereas the diaphragms preferably have a circular circumference, the plate can be any regular geometric shape, such as a circle or polygon, and preferably substantially triangular with lobes at the corners.

In many embodiments the periphery of the diaphragms is smaller than the periphery of the plate. The rim of each diaphragm is welded to the plate, such that symmetric portions of the plate extend radially outside the weld of the diaphragms to the plate. Support of the diaphragm assembly can be at the lobes, at radial positions that are optionally outside the rims of the diaphragms, on the periphery of the rims of the diaphragms outside the welds, over the welds, or inside the welds.

In the embodiment of FIG. 8, each of the upper and lower diaphragm assemblies 4a, 4b is supported within the damping chamber by a retainer assembly. A first retainer 42 of the retainer assembly has a rim portion 42a that bears on and biases the upper surface of one plate 27, a second retainer 43 has a rim portion 43a that bears on and biases the lower surface of the other plate, and a spacer 44 has an inwardly directed portion 44a that bears on and biases the lower surface of the one plate and another inwardly directed portion 44b that bears on and biases the upper surface the lower plate. The upper and lower retainers have outwardly angled tabs 45 that snap vertically into slots 46 formed between the spacer 44 and the flats 28. This holds the parts together as a unit 39 and restrains lateral displacement of the upper and lower diaphragm assemblies, respectively.

Figure 9:
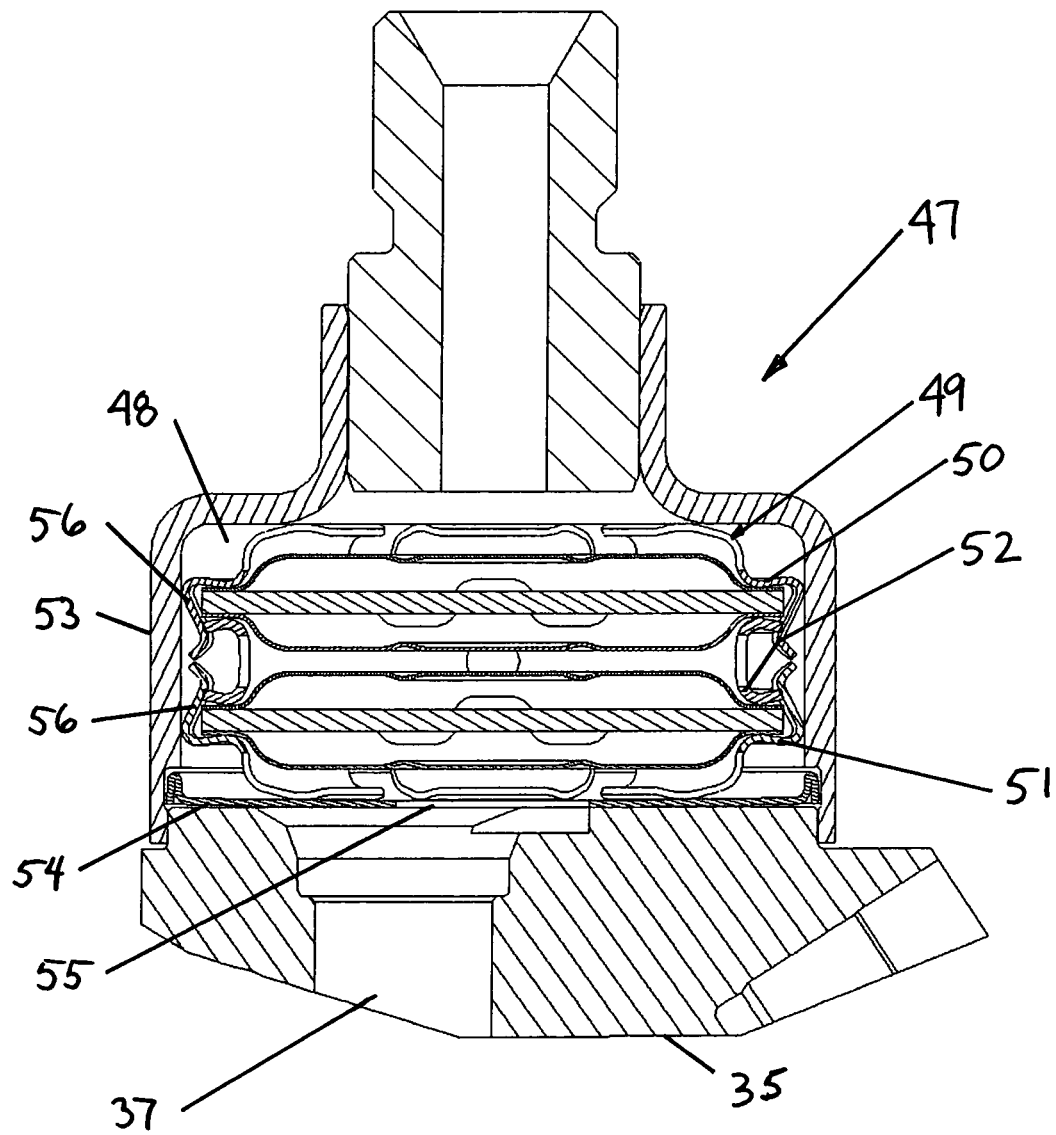
FIG. 9 shows another embodiment of a damper assembly according to the invention.

Another embodiment with the diaphragm assemblies of the type shown in FIG. 4 or 6 is shown in FIG. 9. The damper unit 47 is also attached to the pump 35 as a separate system. As with the other embodiments, a pair of upper and lower diaphragm assemblies is supported within the damping chamber 48 by a retainer assembly 49 that is somewhat similar to that shown in FIG. 5. A first retainer 50 has a portion that bears on and biases the top of the rim of the upper diaphragm assembly, a second retainer 51 has a portion that bears on and biases the bottom of the rim of the lower diaphragm assembly, and a spacer 52 has a radially outwardly directed portion that bears on and biases the bottom of the rim of the upper diaphragm assembly, and another radially outwardly directed rim portion that bears on and biases the top of the rim of the lower diaphragm assembly. The cover 53 retains a base plate 54 such that the damping chamber 48 is defined within the cover independently of the pump. When welded to the body, the cover 53 compresses the damper assembly 49 and thereby effectuates the biases among the first retainer, second retainer, spacer, and pair of diaphragm assemblies. The base plate 51 has an exit port alignable with the fuel inlet passage 37 of the pump.

In FIG. 9, the upper and lower retainers 50, 51 have obliquely inwardly directed prongs 56 that engage the outer edges of the spacer 52, thereby capturing and retaining the rims of the diaphragm assemblies. Another feature of the embodiment shown in FIG. 9, is that the retainer assembly 49 is radially restrained (i.e., substantially centered) within the cover 53, by contact between the retainers 50, 51 and the sidewall of the cover.

Alternatively, the retainer assembly 49 can be entirely self-supporting within the damping chamber, by a clamp or the like (not shown) provided between the base plate 54 and the first retainer 50 to compress the unit and thereby effectuate the biases among the first retainer, second retainer, and coil spring between a pair of diaphragm assemblies, without using the installation force of the cover 53. In this and other embodiments, the spacer 52 can alternatively comprise a coil spring that urges the upper diaphragm assembly upward and the lower diaphragm assembly downward against respective upper and lower retainers.

The invention claimed is:

1. A pressure damper assembly for a fuel inlet passage in a single piston high pressure fuel pump, comprising:
an inlet fitting;
a cover attached to the fitting and having a substantially cylindrical sidewall defining an internal damping chamber in fluid communication with the fuel inlet passage of the pump, and a bottom sealingly attached to the pump;
a pair of upper and lower diaphragm assemblies supported within the damping chamber by a retainer assembly wherein
each said diaphragm assembly includes first and second metal diaphragms having diaphragm rims sealingly secured to respective first and second sides of an imperforate central plate and convex central regions spaced from the central plate, thereby defining first and second independent closed gas volumes radially inward of a surrounding diaphragm assembly periphery;
said retainer assembly includes a distinct first retainer having a portion that bears on and biases the periphery of the upper diaphragm assembly, a distinct second retainer having a portion that bears on and biases the periphery of the lower diaphragm assembly, a distinct spacer between the first and second retainers, having a portion that bears on the periphery of the upper diaphragm assembly in opposition to the first retainer and another portion that bears on the periphery of the lower diaphragm assembly in opposition to the second retainer, with each of the first and second retainers including tabs that engage the spacer, said tabs being situated in slots in the spacer;

whereby feed fuel delivered to the pump through the inlet fitting flows through said damping chamber at a pressure that acts on the first and second diaphragms of each diaphragm assembly before entry into the inlet passage of the pump.

2. The damper assembly of claim 1, wherein the plate and diaphragms are circular, and the plate has a larger radius than the diaphragms; and the rim of each diaphragm is welded to the plate, thereby defining a rim portion of the plate that extends radially outside the weld of the diaphragms to the plate.

3. The damper assembly of claim 1, wherein the plate and diaphragms are circular, and have the same radius defining the circumference of the diaphragms and plate; and the rim of each diaphragm is welded to the plate radially inside of the circumference of the diaphragm.

4. The damper assembly of claim 1, wherein the plate and diaphragms are circular, and have the same radius defining the circumference of the diaphragms and plate; and the rim of each diaphragm is welded to the plate at the circumference of the diaphragm.

5. The damper assembly of claim 1, wherein the first diaphragm is welded to one side of the plate and the second diaphragm is welded to the second side of the plate; and the weld of the first diaphragm to the plate is independent of the weld of the second diaphragm to the plate.

6. The damper assembly of claim 1, wherein the retainer assembly is compressed between a portion of the cover and a surface of the pump;

said first retainer of the retainer assembly has a rim portion that bears on and biases the top of the rim of the upper diaphragm assembly;

said second retainer of the retainer assembly has a rim portion that bears on and biases the bottom of the rim of the lower diaphragm assembly;

said spacer of the retainer assembly has a rim portion that bears on and biases the bottom of the rim of the upper diaphragm assembly, and another rim portion that bears on and biases the top of the rim of the lower diaphragm assembly;

whereby the compressed retainer assembly maintains the diaphragm assemblies in place within the damping chamber.

7. The damper assembly of claim 6, wherein the cover has an open bottom; and the second retainer fits within and is laterally fixed in position by a recess in the pump that is in fluid communication with the fuel inlet passage.

8. The damper assembly of claim 1, wherein the plate has substantially flat upper and lower surfaces and a peripheral edge, and the upper and lower surfaces of the plate extend two dimensionally with different maximum and minimum spans;

the plate minimum span is at least equal to the diameter of the diaphragm rims;

the diaphragm rims are bonded to the plate inside the plate maximum span; and the damper assembly is supported in the damping chamber transversely to the plate, at portions of the upper and lower plate surfaces that are outside the rims of the diaphragms.

9. The damper assembly of claim 8, wherein the damper assembly is laterally supported in the damping chamber, at portions of the peripheral edge of the plate.

10. The damper assembly of claim 8, wherein the plate has a plurality of lobes having the maximum span and a plurality of flats having the minimum span; and the damper assembly is supported in the damping chamber transversely to the plate, at upper and lower surfaces of the lobes.

11. The damper assembly of claim 10, wherein the damper assembly is laterally supported in the damping chamber, at the peripheral edge of the lobes.

12. The damper assembly of claim 10, wherein the damper assembly is laterally supported in the damping chamber, at the peripheral edge of the flats.

13. The damper assembly of claim 1, wherein said first retainer of the retainer assembly has a rim portion that bears on and biases the upper surface of the plate of the upper diaphragm assembly;

said second retainer of the retainer assembly has a rim portion that bears on and biases the lower surface of the plate of the lower diaphragm assembly;

said spacer of the retainer assembly has a portion that bears on and biases the lower surface of the plate of the upper diaphragm assembly and another portion that bears on and biases the upper surface of the lower plate of the lower diaphragm assembly.

14. The damper assembly of claim 13, wherein the tabs restrain lateral displacement of the upper and lower diaphragm assemblies, respectively.

15. The damper assembly of claim 1, wherein the cover has a base plate such that the damping chamber is defined within the cover independently of the pump;

said unit is situated entirely within said damping chamber; and the base plate has an exit port aligned with the fuel inlet passage of the pump.

16. The damper assembly of claim 15, wherein the retainer assembly is compressed between a portion of the cover and the base plate.

17. The damper assembly of claim 16, wherein the diaphragms assemblies are laterally restrained in the damping chamber by contact between the retainer assembly and the sidewall of the cover.

18. The damper assembly of claim 1, wherein the retainer assembly forms a self-supporting unit.

19. A pressure damper assembly for a fuel pump, comprising: a pair of upper and lower diaphragm assemblies, each said diaphragm assembly including first and second metal diaphragms having diaphragm rims sealingly secured to respective first and second sides of an imperforate central plate and convex central regions spaced from the central plate, thereby defining first and second independent closed gas volumes radially inward of a surrounding diaphragm assembly periphery; a retainer assembly including an upper retainer having a portion that bears on the periphery of the upper diaphragm assembly, a lower retainer having a portion that bears on the periphery of the lower diaphragm assembly, and a spacer between said upper and lower retainers having a portion that bears on the periphery of the upper diaphragm assembly in opposition to the upper retainer and another portion that bears on the periphery of the lower diaphragm assembly in opposition to the lower retainer, with each of the upper and lower retainers including obliquely inwardly directed prongs that engage outer edges of the spacer; whereby said upper and lower diaphragm assemblies, said upper and lower retainers and said spacer are connected so that said upper and lower diaphragm assemblies, said upper and lower and said spacer are held together as a unit.

20. The pressure damper assembly of claim 19 wherein the prongs from the upper retainer extend obliquely downward and inward and the prongs from the lower retainer extend obliquely upward and inward.

21. The pressure damper assembly of claim 19 wherein said central plate includes raised features that limit the deflection of one or both of said metal diaphragms.

* * * * *